United States Patent Office 3,279,879
Patented Oct. 18, 1966

3,279,879
PROCESS FOR THE FIXATION OF DYES ON CELLULOSE AND FIXING AGENT THEREFOR
Roland Ohme, Berlin-Grunau, and Ernst Schmitz, Berlin-Adlershof, Germany, assignors to Deutsche Akademie der Wissenschaften Zu Berlin, Berlin-Adlershof, Germany
No Drawing. Filed Oct. 9, 1964, Ser. No. 402,911
4 Claims. (Cl. 8—17)

The present invention relates to a process for the fixation of dyes on natural and regenerated cellulose.

The dyes are to be incorporated on all types of cellulose, such as cotton, Cell-wool, viscose rayon, linen, or hemp. This is to be done by using di- or polyfunctional compounds which are capable of joining on the one hand, the dye, on the other hand, the cellulose, by chemical bonds.

It is already known that dyes having reactive groups are capable of yielding colorings of particular fastness by chemical reaction with cellulose. For instance dyes which contain the dichloro-triazine grouping, react with the hydroxyl groups of cellulose by substitutions; others, e.g. dyes containing vinyl sulfonic groupings, react with cellulose ethers by addition. For preparing the reactive dyes known up to now, it is frequently necessary to use several operational steps by which one or several reactive groups are introduced into the dye or into one of its intermediates.

It has now been found that chemical interaction of fiber and dye may be brought about in a simple manner by adding, during the dyeing operation, polyfunctional reactive compounds, so-called fixing agents, which undergo chemical reaction both with the dye and the fiber. One necessary condition is that the dyes are sufficiently water-soluble; furthermore that the dyes contain a group capable of alkylation, such an amino-, alkylamino-, phenylamino-, mercapto- or sulfinate groups, thus a group which most of the conventional dyes contain anyhow.

Many azodyes contain, for instance, free or mono-substituted amino groups.

Fixing agents suitable for carrying out the invention are compounds of the formula

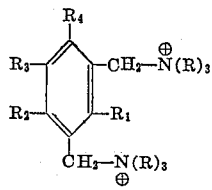

wherein one of the substituents $R_1, R_2$ and $R_4$ stand for a hydroxyl group, whereas the other two represent H or alkyl. $R_3$ is likewise H or alkyl, or also the group $-CH_2-N^+(R)_3$. The radicals R linked to N are simple alkyl radicals, such as methyl, ethyl, cycloalkyl, hydroxyalkyl, or aralkyl; in some cases two such alkyl radicals may form a ring. Such compounds are easily obtained by reacting in aqueous solution a secondary amine with phenyl, the three cresols, xylenols, or other alkyl phenols, by themselves or in mixture with formaldehyde, and subsequently quaternizing the compounds so obtained in a known manner, e.g. with dimethyl sulfate, alkylhalides, ethylene chlorohydrin, or alkylene oxides. In this manner, concentrated aqueous solutions of polyfunctional quaternary ammonium compounds are obtained which may directly be used as fixing agents.

The so-called fixing agents are effective for alkylating purposes at temperatures from 80 to 150° C., preferably at 130° C., in the presence of alkaline agents, e.g. alkali metal hydroxides, tertiary sodium phosphate, or tetraalkyl ammonium hydroxide, e.g. trimethyl-benzyl-ammonium hydroxides. The incorporate alkyl groups into the dye, on the one hand, and into the cellulose, on the other hand, thereby effecting a chemical fixation of the dye on the cellulose, as illustrated by the following reaction principle,

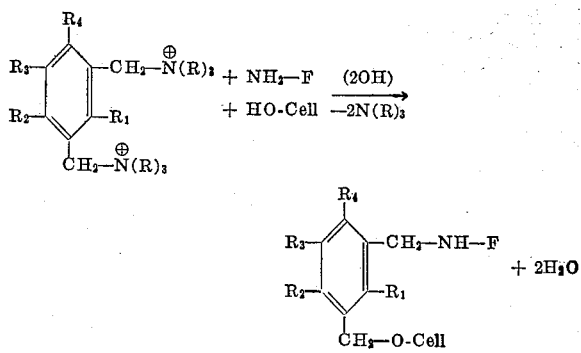

whereby F—NH$_2$ stands for an amino group-containing dye and Cell-OH represents cellulose. In case $R_3$ stands for a further grouping —CH$_2$—N$^+$(R)$_3$, a further linkage to the dye, or to the cellulose, may be accomplished.

The coloring is brought about according to the invention by adding the fixing agent to the approximately 1–3% solution of an alkylatable dye, the fixing agent being preferably in equimolar amount, and 2–3 equivalents of effective alkali being likewise added; the dyeing being done as required at 10–70° C. in a conventional manner, if necessary with addition of salts, such as sodium sulfate, or sodium chloride, and with or without addition of urea. In many cases, it is advantageous to add the alkali towards the end of the dyeing process. Fixation is brought about, if necessary after intermediate drying, by heating of the colored fiber to 80–150° C., preferably to 130°; at the last mentioned temperature, this will require 3 to 10 minutes. Thermal fixation may either be brought about by hot air, hot steam, or infrared treatment. However, it may also be effected by simple heating of the dye bath to 90–100° C. After fixation, the fiber will be soaped at boiling temperature.

Fixation of the dye on the fiber may also be effected by carrying out a normal dyeing procedure with the above named dyes and thereafter applying, after intermediate drying, an alkaline after-treatment bath containing a fixed agent and thereby achieving fixation as above described.

Chemically fixed colorings may also be obtained by fixing dye components capable of diazotizing on the fiber, said components also containing further groups capable of alkylation, for instance, m-phenylene-diamine, or 1,5-naphthylene diamine, and thereafter, diazotizing the fiber and developing. The fixing agents may also be used for cloth printing which is done by mixing the above mentioned dyes, equimolar amounts of the fixing agent, and alkali with a thickening agent, printing the paste and fixing by heating.

The process has the advantage that it permits to use simple dyes for coloring cellulose materials, whereas they were, up to now, only applicable for dyeing wool; the fastness obtained is equal to that known up to now for reactive colorings only. The advantage as compared to the latter colorings consists therein that the new process may use conventional dyes for obtaining reactive coloring.

The invention will now be more fully described in a number of examples, but it should be understood that these are given by way of illustration and not of limitation, and that many changes in the details may be made without departing from the spirit of the invention.

Example 1

Fixing agent: 18.82 g. phenol (⅕ mol) are dissolved in 114.2 cc. 25.4% dimethylamine solution (⅗ mol). Within 30 minutes, 52.6 cc. 33.6% formalin (⅗ mol) are added drop by drop at 20–25° C., and the solution is then heated while stirring for two hours to 90° C. Then the solution is cooled down to 20° C. and 75.08 g. (⅗ mol) freshly distilled di-methyl sulfate are slowly added drop by drop, whereby the temperature must not exceed 40° C. Stirring is continued for two hours at room temperature. After quaternization, the solution shows neutral reaction.

1.1 cc. of the fixing agent contains 1 mmol of 2,4,6-tris-dimethylaminomethyl-phenol-tris-methomethylsulfate.

0.277 g. of the dye

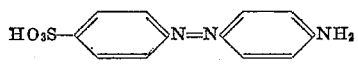

are dissolved in 20 cc. water with addition of 1 g. urea; NA₂CO₃ solution in 200 cc. of hot water; viscose rayon is dyed with this solution for 15 minutes at 90° C. It is then cooled and 1 cc. of the above described fixing solution is added together with 0.68 g. of a 40% aqueous solution of trimethyl-benzylammonium hydroxide. After 15 more minutes, fixation is effected in hot air of 130° C. for 6 to 10 minutes; subsequently, soaping at boiling temperature is carried out for 10 minutes. Fixation with hot steam of 120° C. or infrared fixation lead to the same result. Obtained is a golden-yellow coloring of great fastness to laundering.

Example 2

Fixing agent: As described in Example 1, a fixing solution is prepared from ⅕ mol phenol, ⅗ mol diethylamine, ⅗ mol formalin and ⅗ mol diethylsulfate with 132 cc. water as solvent; the solution contains in 1.45 cc. 1 mmol 2,4,6 - tris - diethylammonium methyl - tris - ethoethylsulfate.

0.424 g. of the dye

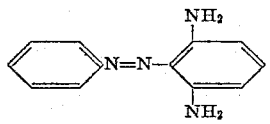

are dissolved in 20 cc. water with addition of 1 g. urea; in this solution, linen is dyed for 15 minutes at 90° C. After having cooled the dye bath, 6 cc. of the above described fixing solution and 4 cc. 2 N NaOH are added. Dyeing is continued for another 15 minutes at room temperature, then the fabric is squeezed and fixing is done with hot air at 130° C. for 10 minutes, whereafter the fabric is soaped at boiling temperature. An orange color of high fastness to laundering is obtained.

Example 3

Fixing agent: As described in Example 1, a fixing solution is prepared from ⅕ mol phenol, ⅗ mol piperidine, ⅗ mol formalin, and ⅗ mol dimethylsulfate with 175 cc. water; said solution contains in 1.67 cc., 1 mmol of the tri-functional quaternary ammonium compound.

(a) 0.291 g. of the dye

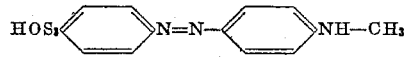

is dissolved in 24 cc. water with addition of 1 cc. 2 N Na₂CO₃ solution. With this solution, cotton fabric is dyed for 15 minutes at 90° C., then cooling is effected and the above fixing solution is added in the amount of 1.7 cc. together with 1 cc. of 2 N NaOH and dyeing is continued for 15 minutes at 20° C.; the fabric is then squeezed, fixed for 10 minutes with hot air at 130° C. and soaped at boiling temperature. Obtained is a yellow coloring of high fastness to laundering.

(b) 0.342 g. of the dye

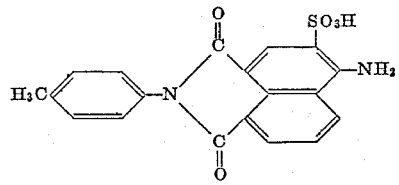

are dissolved in 15 cc. water with addition of 1 g. urea and 0.5 cc. 2 N Na₂CO₃ solution. With this solution a staple fiber fabric is dyed for 10 minutes at 90 to 100° C. After cooling, 1.7 cc. of the above described fixing solution as well as 1 cc. 2 N NaOH are added, and dyeing is continued for another 15 minutes at 20° C. The fabric is then squeezed and fixed for 5 minutes at 130° C. Finally, it is soaped at boiling temperature, whereby a light-yellow coloring of good fastness to laundering is obtained.

Example 4

Fixing agent: As described in Example 1, the fixing solution is prepared from ⅕ mol m-cresol, ⅗ mol dimethylamine, ⅗ mol formalin, and ⅗ mol dimethylsulfate, which contains in 1.1 cc. 1 mmol 2,4,6-tris-dimethylaminomethyl-3-methylphenol-tris-methomethylsulfate.

(a) 0.774 g. of the dye

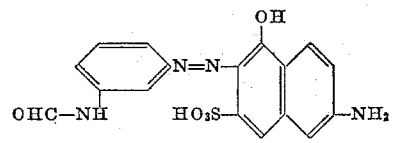

are dissolved in 20 cc. water with addition of 2 g. urea and 2 cc. 2 N Na₂CO₃ solution. To this one adds, 3.3 cc. of the above fixing solution and dyes a linen fabric with addition of 2 g. Na₂SO₄ for 20 minutes at 40° C. Then one squeezes the fabric and fixes the solution for 5 minutes at 130° C. Subsequently, the fabric is soaped at boiling temperature. A rust-brown coloring is obtained of a high fastness to laundering.

(b) 0.275 g. of the dye

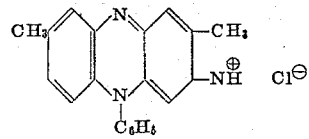

are dissolved in 15 cc. water with addition of 0.5 cc. 2 N Na₂CO₃ solution. With the solution a cotton fabric is dyed for 15 minutes at 90° C. Cooling is then effected and 1.1 cc. of the above described fixing agent added together with 1 g. Na₂SO₄ in 1 cc. 2 N NaOH; dyeing is continued for 10 minutes at 30° C. The fabric is squeezed and fixing is carried out for 10 minutes at 130° C. After soaping at boiling temperature, a very intense wine-red coloring of high laundering fastness is obtained.

(c) 0.272 g. of the dye

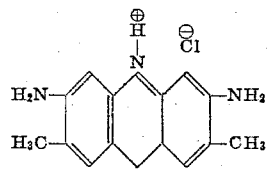

are dissolved in 15 cc. water with addition of 0.5 cc. 2 N Na₂CO₃ solution. Viscose rayon is dyed with this solution for 10 minutes at 90° C. After cooling, 1.1 cc. of the above described fixing agent is added to the bath; after the addition of 1 cc. 2 N KOH, dyeing is continued for 10 minutes at 30–40° C. The fabric is then squeezed and fixing is performed at 130° C. for 6 minutes. After soaping at boiling temperature, a yellow coloring of high laundering fastness is obtained.

Example 5

Fixing agent: As described in Example 1, a fixing solution is prepared from ⅕ mol o-cresol, ⅖ mol dimethylamine, ⅖ mol formalin, and ⅖ mol dimethylsulfate, which contain in 0.73 cc. 1 mmol 2,4-di-dimethylaminomethyl-6-methylphenol-dimethomethylsulfate.

0.4 g. of the dye

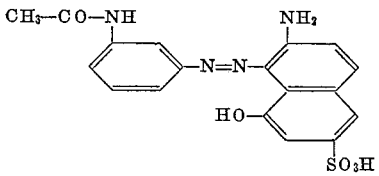

are dissolved in 15 cc. water with addition of 0.5 cc. 2 N Na₂CO₃ solution. Added are further 1 g. urea, 0.75 cc. of the above fixing solution and 1 cc. 2 N NaOH and one dyes a Cell-wool fabric for 30 minutes at 40° C. The fabric is then squeezed, fixing is carried out for 10 minutes at 130° C., soaping is performed at boiling temperature, and obtained is a red coloring of high laundering fastness.

Example 6

Fixing agent: As described in Example 1, a fixing solution is prepared from ⅕ mol p-cresol, ⅖ mol dimethylamine, ⅖ mol formalin, and ⅖ mol dimethylsulfate, which contains in 0.75 cc. 1 mmol 2,6-di-dimethylaminomethyl-4-methylphenol-dimethomethylsulfate.

0.45 g. of the dye

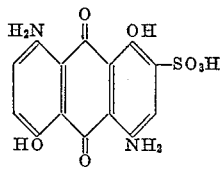

are dissolved in 15 cc. water with addition of 0.5 cc. 2 N Na₂CO₃ solution. A cotton fabric is dyed for 20 minutes at 90° C. Cooling is performed and 0.75 cc. of the above mentioned fixing solution is added together with 1 cc. 2 N NaOH; dyeing is continued for 15 minutes at 20° C. The fabric is squeezed and the coloring is fixed for 5–10 minutes at 130° C. After soaping at boiling temperature, a blue coloring of high laundering fastness is obtained.

Example 7

Fixing agent: As described in Example 1, a fixing solution is prepared from 25 g. technical xylenol mixture (boiling point₇₆₀=213 to 221° C.), ⅖ mol dimethylamine, ⅖ mol formalin, and ⅖ dimethylsulfate, which contains in 0.75 cc. about 1 mmol di-functional quaternary ammonium compounds.

0.70 g. of the dye

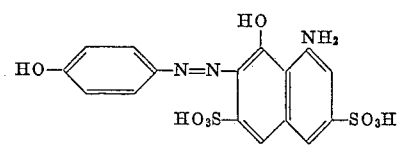

are dissolved together with 2 g. urea and 2 cc. 2 N Na₂CO₃ solution in 20 cc. water, and thereafter are added 2 cc. of the above fixing solution and 4 cc. 2 N NaOH. With the solution, a cellulose fabric is dyed for 30 minutes at 40 to 50° C., then squeezed and dried. The dried fabric is heated for 10 minutes at 130° C. After soaping at boiling temperature, a brown coloring of high fastness to laundering is obtained.

Example 8

Fixing agent: As described in Example 1, a fixing solution is prepared from 22 g. technical cresol mixture (boiling point₇₆₀=197 to 206° C.), ⅗ mol dimethylamine, ⅗ mol formalin, and ⅗ mol dimethylsulfate.

(a) 0.684 g. of the dye

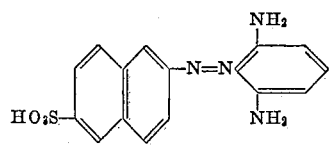

are dissolved in 20 cc. water with addition of 2 cc. 2 N Na₂CO₃ solution. Further added are 2 cc. of the fixing agent and 1 g. Na₂PO₄. A cotton fabric is dyed for 30 minutes at 40° C., squeezed and fixed for 5 to 10 minutes at 120 to 130° C. After soaping at boiling temperature, a red-brown coloring of good fastness to laundering is obtained. (b) The same dye is used for dyeing as described under (a). However, no fixing agent is added; after dyeing and drying, the fabric is introduced into a solution containing 2 cc. of the above fixing agent and 0.2 g. NaOH in 15 cc. water. After 15 minutes, the fabric is squeezed and fixed at 120 to 130° C. After soaping at boiling temperature, a brown-red coloring with good laundering fastness is obtained.

Example 9

Fixing agent: 27 g. benzylmethylamine (0.22 mol) and 6.95 g. phenol (0.074 mol) are dissolved in 50 cc. ethanol. To this, 22 cc. (0.22 mol) 30% formalin are added drop by drop at room temperature within 20 minutes while stirring vigorously. While stirring is continued, the solution is refluxed for two hours. It is then allowed to cool and, while being stirred, 28 g. (0.22 mol) dimethylsulfate are added, while care is taken that the temperature will not rise above 25° C. A colorless, homogeneous solution is obtained thereby. Ethanol is withdrawn as completely as possible in vacuo with the temperature not rising above 30° C. 1 cc. of the so obtained fixing agent contains 1 mmol 2,4,6-trismethyl - benzyl - aminomethylphenol - trismethomethylsulfate. 0.5 g. of the dye obtained by reaction of 1 mol phthalocyanine-tetrasulfo-chloride with 4 mol 1,4 diaminobenzene-2-sulfoacid, was dissolved in 24 cc. water with addition of 1 g. urea and 2 cc. 2 N Na₂CO₃ solution. With this solution viscose rayon is dyed for 15 minutes at 100° C., then it is allowed to cool and 4 cc. of the above fixing agent are added to the solution. Dyeing is continued for 20 minutes at 20° C., whereafter 3 cc. 2 N NaOH are added and allowed to act for 5 minutes. The fabric is then squeezed and fixed for 10 minutes at 130° C. After soaping at boiling temperature, a blue-green color is obtained of satisfactory laundering fastness.

Example 10

0.108 g. 1,3 diaminobenzene are dissolved with addition of 1.5 cc. 2 N NaOH in 10 cc. water. To this is added 0.55 cc. of the fixing agent described in Example 1 and a cotton fabric is dyed with the solution for 10 minutes at 30° C., whereafter it is squeezed and the bottom color is fixed for 10 minutes at 130° C., with subsequent soaping at boiling temperature. Thereupon, diazotizing takes place on the fiber at 0° C. with a solution of 0.07 g. NaNO₂ and 1.5 cc. 2 N HCl in 8 cc. water, and the coloring is developed in a solution of 0.144 g. β-naphthol and 2 cc. 2 N NaOH in 5 cc. water. Soaping at boiling temperature is performed and yields a rust-brown coloring of high laundering fastness.

Example 11

0.350 g. of the dye

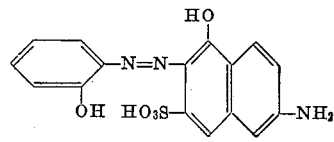

are dissolved in 15 cc. water. Added are 1 g. urea, 1 g. NaCl, and 3 cc. of the fixing agent described in Example 1, plus 6 cc. 2 N NaOH. With this, a viscose rayon fabric is dyed for 15 minutes at 100° C. Subsequently, the fabric is soaped at boiling temperature which yields a wine-red coloring of good laundering fastness. By after-treatment with copper, a purple coloring is obtained of high intensity and very good laundering fastness. While in the above examples a fixing temperature from 100–130° C. has been mentioned, it should be understood that fixing can be performed at lower temperatures, e.g., 80–100° C., in which case 10–15 min. will be an appropriate time, or at temperatures from 140–150° C. with a heating time of 2–4 minutes.

*Example 12*

1.58 g. of the dye

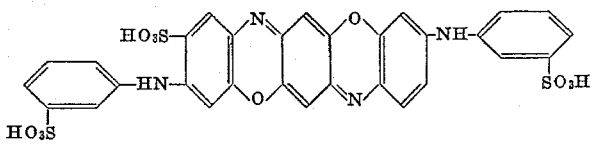

are dissolved with addition of 4 cc. 2 N Na₂CO₃ solution in 20 cc. water. With this solution, a viscose rayon is dyed for 15 minutes at 100° C. After cooling, 3 cc. of the fixing agent described in Example 1 are added together with 3 cc. 2 N NaOH and the fabric is dyed at 15 minutes at 20° C., sequeezed and fixed for 5 minutes at 130° C. After repeated soaping, a blue coloring of good laundering fastness is obtained.

*Example 13*

0.439 g. of the dye

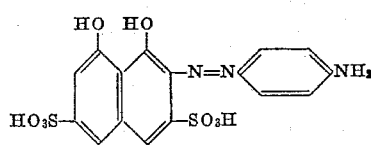

is dissolved with addition of 1 cc. 2 N Na₂CO₃ solution in 15 cc. water. In this solution, a viscose rayon fabric is dyed for 10 minutes at 90° C. The fabric is cooled and 1.5 cc. of the fixing agent described in Example 1 are added with 2 cc. 2 N NaOH; then dyeing is continued for 15 minutes at 20 to 30° C., the fabric squeezed, dried and fixed for 10 minutes at 130° C. After soaping at boiling temperature, a dark blue coloring of good laundering fastness is obtained.

*Example 14*

0.274 g. of the dye

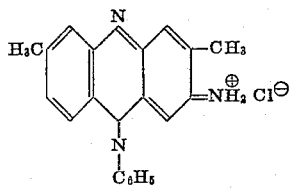

is dissolved in 6 cc. water and added thereto are 4 cc. of the fixing agent described in Example 1. The solution is mixed with a solution of 0.5 g. sodium alginate in 25 cc. water. Then one adds 3 cc. 30% NaOH and prints a cotton fabric therewith. After 5 to 15 minutes, the print is fixed at 130° C. for 10 minutes in hot air. After soaping at boiling temperature, a purple coloring is obtained of good laundering fastness.

*Example 15*

0.360 g. of the dye

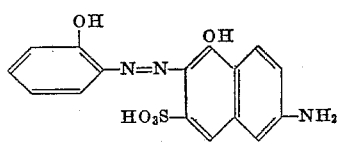

is dissolved in 6 cc. water and thereto are added 5 cc. of the fixing agent described in Example 1, and mixed therewith is a solution of 0.5 g. sodium alginate in 25 cc. water. Further added are 3 cc. 30% NaOH and with this solution rayon fabric is printed. After 15 minutes, the print is fixed for 10 minutes at 130° C., soaped at boiling temperature and yields a wine-red coloring of good laundering fastness.

*Example 16*

Fixing agent: ⅕ mol phenol is reacted with ⅗ mol dimethylamine, and ⅗ mol formalin, as described in Example 1, whereafter ⅗ mol methyliodide is added and the mass is stirred for 3 hours at 35° C., until completely dissolved. Obtained are 170 cc. of a fixing agent which contains ⅕ mol 2,4,6-tris-dimethylaminomethyl-phenol-trimethoiodide. For fixation of dyes on cellulose, a procedure according to Example 2 is used.

*Example 17*

Fixing agent: To a solution of ⅗ mol diethanolamine in 58 cc. water, ⅕ mol phenol is added and ⅗ mol formalin is added drop by drop at room temperature. After 2 hours stirring at 90° C., ⅗ mol dimethylsulfate is added drop by drop at 20° C., and stirring is continued for 1 hour. Obtained are 220 cc. of a fixing agent which contains ⅕ mol 2,4,6-tris-(di-β-hydroxyethylamino-methyl) phenol-trimethomethylsulfate.

For the fixation of dyes on cellulose, the procedure as described in Example 2 is used.

*Example 18*

Fixing agent: The process is carried out as described in Example 17, using as an alkylating agent ⅗ mol ethylene-chlorohydrin at 20° C. After standing for 4 days at 20° C., the fixing agent is ready for use. It contains in 212 cc. ⅕ mol 2,4,6 - tris(di-β-hydroxyethylaminomethyl)-phenol-tri-β-hydroxyethochloride.

For the fixation of dyes on cellulose, the procedure as described in Example 2 is used.

What we claim is:

1. A process for chemically fixing dyes on natural or regenerated cellulose materials which comprises adding to an aqueous alkaline dyeing medium having dissolved therein a water-soluble alkylatable dye, said medium being in contact with the cellulose material to be dyed, a polyfunctional alkylating agent of the general formula

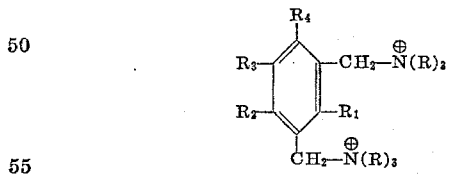

in which one of the symbols R₁, R₂ and R₄ represents hydroxyl, and the two other of said symbols stand for a substituent selected from the group consisting of H and alkyl, R₃ represents a member of the group consisting of H, alkyl, —CH₂—N⁺(R)₃, and R represents alkyl, cycloalkyl, hydroxyalkyl, and aralkyl, and subjecting the thus treated cellulose material to a temperature of about 80–150° C., whereby said polyfunctional alkylating agent both alkylates said dye and said cellulose material, thereby chemically fixing said dye to said cellulose material.

2. Method according to claim 1 wherein said alkylatable dye contains at least one alkylatable radical selected from the group consisting of amino, phenylamino and alkylamino.

3. Method according to claim 1 wherein said aqueous alkaline dyeing medium contains as alkaline agent at least one substance selected from the group consisting of alkali metal hydroxides, tertiary sodium phosphate and tetraalkyl ammonium hydroxide.

4. Method according to claim 1 wherein the cellulose material to be dyed is first treated with the alkylatable dye and is then treated with an alkaline agent and with said polyfunctional alkylating agent.

References Cited by the Examiner

UNITED STATES PATENTS 2,218,344  10/1940  Reynolds et al. _____ 8—84 X
2,220,834  11/1940  Bruson et al. _____ 8—84 X

FOREIGN PATENTS 803,821  10/1936  France.

OTHER REFERENCES

Diserens, The Technology of Dyeing and Printing, vol. 2, page 9, pub. by Reinhold Publishing Corp., 1951.

NORMAN G. TORCHIN, *Primary Examiner.*

T. J. HERBERT, *Assistant Examiner.*